United States Patent [19]
Smith

[11] Patent Number: 5,700,856
[45] Date of Patent: Dec. 23, 1997

[54] PEROXIDE-GENERATING COMPOSITION FOR USE WITH UNSATURATED POLYESTER RESINS AND METHOD OF USE

[75] Inventor: Stuart B. Smith, Conyers, Ga.

[73] Assignee: Hehr International Inc., Conyers, Ga.

[21] Appl. No.: 629,895

[22] Filed: Apr. 10, 1996

[51] Int. Cl.$^6$ .................. C08K 5/00; C08F 2/46; C08J 3/28

[52] U.S. Cl. .......... 524/176; 528/272; 528/306; 528/308; 525/168; 525/437; 525/445; 524/176; 522/24; 522/29; 522/60; 522/71; 522/104; 523/515; 523/526

[58] Field of Search ............... 528/272, 306, 528/308; 525/168, 437, 445; 524/176; 522/24, 29, 60, 71, 104; 523/515, 526

[56] References Cited

U.S. PATENT DOCUMENTS

| | | | |
|---|---|---|---|
| 3,959,210 | 5/1976 | Lipatova et al. | 524/425 |
| 4,138,385 | 2/1979 | Uffner et al. | 523/514 |
| 4,163,093 | 7/1979 | Hess et al. | 528/301 |
| 4,212,790 | 7/1980 | Ibata et al. | 525/39 |
| 4,299,950 | 11/1981 | Iwata et al. | 528/306 |
| 4,532,297 | 7/1985 | Gardner | 525/48 |
| 4,618,703 | 10/1986 | Thanawalla et al. | 560/209 |
| 4,708,982 | 11/1987 | Banno et al. | 525/92 |
| 4,954,472 | 9/1990 | Scott et al. | 502/152 |
| 5,091,436 | 2/1992 | Frisch et al. | 521/137 |
| 5,206,281 | 4/1993 | Furuta | 524/425 |

*Primary Examiner*—Samuel A. Acquah
*Attorney, Agent, or Firm*—Richard P. Crowley

[57] ABSTRACT

A peroxide-generating composition for use in curing an unsaturated polyester resin and to the cured unsaturated polyester resin composition so prepared, particularly unsaturated polyester resin compositions containing inert filler materials used prepare a cast or molded product. The peroxide-generating composition comprises an allyl alcohol alkanoate, such as allyl alcohol propoxylate, which in the presence of a metal salt promoter, such as cobalt carboxylate, either with the allyl alcohol alkanoate or separately as a prepromoter in the unsaturated polyester resin composition provides for the generation from the allyl alcohol alkanoate of a peroxide to effect the in situ cure of the unsaturated polyester resin composition.

22 Claims, No Drawings

PEROXIDE-GENERATING COMPOSITION FOR USE WITH UNSATURATED POLYESTER RESINS AND METHOD OF USE

BACKGROUND OF THE INVENTION

Polyester resins are synthetic resins which are polycondensation products prepared by the reaction of dicarboxylic acids with dihydroxy alcohols. Unsaturated polyester resin compositions contain ethylenic unsaturation usually introduced by unsaturated acids, either alone or in combination with saturated acids. Unsaturated polyester resins are cross linked with a compatible monomer, such as a styrene monomer or an acrylic monomer, in amounts ranging from up to 50% by weight, thus providing in the presence of a catalyst or curing agent, like a peroxide, a cured polyester thermosetting resin. Unsaturated polyester resins are prepared typically by maleic and fumaric acids, which may include saturated acids, such as phthalic and adipic acids, and which unsaturated acids may be acid anhydrides. Generally, the dihydroxy alcohols are ethylene, propylene, diethylene and dipropylene glycols. Cross linking agents are usually a styrene monomer and diallyl phthalate.

Unsaturated polyester resins for use in thermoset cast products are prepared with the employment of inert filler material, such as fiber-like glass fibers and particulate-type materials, like limestone, aluminum trihydrate (ATH), sand, silicates, mica, quartz, pigments and various combinations thereof, typically ranging from about 50 to 300 parts of inert particulate filler to 100 parts of the unsaturated polyester resin or about 0% to 30% by weight of glass fibers. The cast products produced may vary in thickness, depending upon the nature of the product. For example, sinks and countertops may have a thickness of one-half to one inch; however, bowling balls and cores are made for example up to eight or ten inches in diameter. The polyester resin is admixed with the particulate material, then cast in a mold and cured. In the case of glass fibers or particulate material, the material may also be sprayed to form laminates in open or closed molds.

The unsaturated polyester resins are generally cured with the use of organic peroxides, such as for instance, but not limited to methyl ethyl ketone peroxide, usually in the presence of a metal salt promoter, such as a metal carboxylate, for example, a cobalt salt, like cobalt octoate or copper napthalate, and optionally further, in combination, metal carboxylates and amines, such as dimethyl aniline or amides, such as dimethyl acetamide, or other accelerators.

The use of metal salt promoters in combination with the organic peroxide is required in order to provide a sufficient curing temperature exotherm to provide for the curing of the polyester resin. The exothermic nature of the combination of an organic peroxide and a promoted, unsaturated polyester resin can provide an exotherm which exceeds 350°–450° F. in temperature. While the combination of the organic peroxide and promoter provides for cure of a polyester resin, a high temperature exotherm is often undesirable, since it may cause scorching and splitting of the cast product, particularly where the product has a thickness, for example, of about one-quarter of an inch or greater. Thus, there is a very fine line existing between the balancing of the promoters and peroxides used in unsaturated polyester resin cures in order not to provide too high an exotherm, but sufficient exotherm to promote the cure of the unsaturated polyester resin.

Generally, in the unsaturated polyester resin composition, the diluent monomer therein contains an inhibitor, such as benzoquinone, in an amount sufficient to extend the storage life of and to prevent premature cross linking. An organic peroxide is added to the promoted unsaturated polyester resin composition (promoted with the metal salt and/or amines) with the particulate material just prior to casting, spraying or the manufacture of the cast product.

It is desirable to provide for a new and improved additive composition for the curing with a low exotherm of unsaturated polyester resins and for the cured polyester resin so prepared, particularly where such cured polyester resins contain particulate material and are designed to form cast products which may be subject to splitting or scorching at high temperature exotherms.

SUMMARY OF THE INVENTION

The invention relates to a peroxide-generating composition for use with an unsaturated polyester resin to provide a low exotherm, peroxide-cured polyester resin, to the cured polyester resin so prepared and to the method of preparing such cured polyester resin composition.

The invention comprises a peroxide-generating additive composition for use with an unsaturated polyester resin composition, to provide a low exotherm, peroxide-cured polyester resin composition, typically with an exotherm of less than about 250° F., and more particularly, less than about 200° F. The additive composition comprises an ethylenically unsaturated hydroxy-containing alkanoate, which is an allyl alcohol $C_2$–$C_6$ alkanoate, and more particularly, in the preferred embodiment, allyl alcohol ethoxylate or propoxylate and a metal salt promoter either in the additive composition or in the promoted unsaturated polyester resin composition to which the allyl alcohol alkanoate is added. The metal salt promoter is in sufficient concentration to generate from the allyl alcohol alkanoate an organic peroxide in situ in the unsaturated polyester resin, either alone or in combination with other added organic peroxides, to provide for a cured polyester resin composition, particularly for the use in preparation of cast filler-containing products.

The employment of the allyl alcohol compound provides for a chemically-generated peroxide in the unsaturated polyester resin, particularly of low styrene monomer, e.g. less than 30% by weight, unsaturated polyester resins in the cultured marble industry for casting products. The filler-unsaturated polyester resins of the invention are characterized by very low exotherms and low product shrinkage, while gel times of the polyester resin can be adjusted as desired, typically from one to thirty minutes. The additive composition is added to the selected unsaturated polyester resin which in the presence of the metal salt promoter and the allyl alcohol alkanoate generates a peroxide in situ to provide for curing the resin. The formation of the in situ-generated peroxide is slow and controlled, resulting in a low exotherm and low shrinkage of the resulting cured resin. Unlike conventionally catalyzed methyl ethyl ketone peroxide cured unsaturated polyester resins, the unsaturated resins cured by the additive composition with the use of the allyl alcohol alkanoates provide cured unsaturated resins which are not as brittle as conventional resins, and thus permit higher filler loading, for example, from 50 to 350 or more parts per 100 parts of resin.

The allyl alcohol alkanoates, such as the allyl alcohol ethoxylate or propoxylate or butoxylate, may be used alone or in combination with other organic peroxides or catalysts and generally is merely added to the unsaturated polyester resin which usually already contains the metal salt promoter, or the additive composition may contain both the allyl alcohol alkanoate and the metal salt promoter, together with any amine or amide accelerators as desired.

The amount of the allyl alcohol alkanoate may vary depending upon the cured product to be produced and the needed amount of cure and the desired exotherm. However, the allyl alcohol alkanoate is typically employed in amounts from about 1% to 20% by weight of the unsaturated polyester resin, and more typically, 6% to 12% by weight. Sufficient allyl alcohol alkanoate together with the metal salt promoter is used to overcome the inhibitor level employed in the unsaturated polyester resin, such as an inhibitor level of 100 ppm or less, and would polymerize the polyester resin by the generated in situ peroxide with excellent physical properties and very low exotherms as compared, for example, to the conventional methyl ethyl ketone peroxide as a curing agent.

In a preferred embodiment, it has been discovered that allyl alcohol propoxylate, when contacted with a cobalt carboxylate, such as a cobalt hydrocarbon, like cobalt octuate, will form a peroxide to cure an unsaturated polyester resin at low exotherms. The allyl alcohol propoxylate has a dual functionality intermediate with low thermobility and excellent reactivity having an hydroxyl number of about 370 to 380 and is soluble in hexane, toluene and alcohols (allyl alcohol propoxylate is a commercial product sold by Arco Chemical Co.).

Metal salt promoters used in combination with the unsaturated polyester resin and/or the allyl alcohol alkanoate comprise a wide variety of metals, but would include cobalt and copper metals, generally as metal carboxylates, such as metal fatty acids or as napthanates. The amount of metal salt promoters may vary, but based upon the unsaturated resin compositions, typically range from about 0.05% to 2% by weight, for example, 0.2% to 1.0% by weight. The amine accelerators, which are optional, may range from about 0.01% to 1% by weight of the unsaturated polyester resin composition. The metal salt promoter may be employed all together with the allyl alcohol alkanoate in combination in an additive composition, or may be added separately to the unsaturated resin composition at about the same time that the allyl alcohol alkanoate is added. In one preferred embodiment, a peroxide-generating composition for use to generate in situ peroxide in an unsaturated resin composition comprises the allyl alcohol alkanoate in combination with a metal salt promoter. The allyl alcohol propoxylate does not oxidize on contact with metals, however it is flammable, but is far safer than the hazardous nature of typical organic peroxides, like methyl ethyl ketone peroxide, which have created fires and explosions in shipping and handling.

The additive of the invention has been found particularly useful in creating low exotherms with unsaturated polyester resin compositions comprising propylene glycol or neo pentyl glycol reacted with maleic anhydride with the use of saturated acids, such as orthophthalic or isophthalic acid, and where the metal salt promoter comprises a cobalt octoate wherein the allyl alcohol alkanoate is allyl alcohol propoxylate to provide exotherms of about 200° F. or less.

Gel and cure times of various unsaturated polyester resins may be affected primarily by catalyst concentration and temperature of curing. Variations in cure characteristics may be caused by such catalyst variation, humidity, pigments, fillers and other additives employed. It is further recognized that the unsaturated polyester resin composition, besides containing the unsaturated polyester resin and diluent monomers, and the inhibitor, may contain various other additives conventionally employed in polyester resins, such as pigments; fillers; accelerators; curing agents; plasticizers; surfactants, such as silicone; flame retardants; fungicides; heat stabilizers; lubricants; viscosity control agents; monomers; antistatic agents; biocides; antioxidants; dyes; fibers; particles; clays; and other additive agents.

The invention will be described for the purposes of illustration only in connection with certain embodiments; however, it is recognized that those persons skilled in the art may make various modifications, changes, additions and improvements to the illustrated embodiments, without departing from the spirit and scope of the invention.

DESCRIPTION OF THE EMBODIMENTS

Example 1

A commercial, general purpose unsaturated resin composition (propylene glycol-orthophthalic and maleic acid) was obtained (McWhorter unsaturated polyester 718–6824, a prepromoted (cobalt octoate), low color, cultured marble resin). Limestone as a filler material in the amount of 50 parts was admixed with 50 parts of the resin. The 50% $CuCO_3$ unsaturated polyester resin was prepromoted with a cobalt salt and was then separately catalyzed into a 0.125 inch casting with one casting having one part (2%) of methyl ethyl ketone peroxide (MEKP) (9% oxygen), and another casting with five parts (10%) of allyl alcohol propoxylate (AAP) with the following results:

|  | MEKP | AAP |
|---|---|---|
| Gel Time 1.0% DDM ÷ 9 77 F min | 15–17 | 10 |
| Gel to Peak (min.) | 10–15 | 12 |
| Peak Exotherm (°F.) | 260–280 | 140 |
| Flexural Strength (psi) ASTM D-790 | 15,300 | 15,400 |
| Flexural Modulus (psi) ASTM D-790 | 625,000 | 630,000 |
| Tensile Strength (psi) ASTM D-638 | 10,200 | 10,150 |
| Tensile Elongation (%) ASTM D-638 | 1.9 | 2.2 |
| Hardness, 934.1 ASTM D-2583 | 45–47 | 45–47 |
| Heat Deflection Temp. (F.°) ASTM D-648 | 161 | 179 |

With MEKP, the maximum exotherm was 420° F.; however, lower levels of MEKP and promoter may reduce this exotherm, but not below 250° F. for a cured product. The AAP produced a cast product of the same or similar cured properties with a very low exotherm.

Example 2

The example was repeated substituting a different unsaturated polyester resin (neo pentyl glycol-isophthalate-maleic acid cobalt prepromoted resin McWhorter 148–2285, McWhorter Technologies, Inc.) with the following results:

|  | MEKP | AAP |
|---|---|---|
| Gel Time (min.) | 14–16 | 8 |
| Gel to Peak (min.) | 10–12 | 12 |
| Peak Exotherm (°F.) | 360–390 | 140 |
| Flexural Strength (psi) ASTM D-790 | 17,500 | 17,620 |
| Flexural Modulus (psi) ASTM D-790 | 575,000 | 572,100 |
| Tensile Strength (psi) ASTM D-638 | 7,850 | 7,870 |
| Tensile Modulus (psi) ASTM D-638 | 525,000 | 530,000 |
| Tensile Elongation (%) ASTM D-638 | 1.9 | 2.2 |
| Hardness, ASTM D-2583 | 45–50 | 45–50 |
| Heat Deflection Temp. (°F.) ASTM D-648 | 230 | 235 |

The use of allyl alcohol propoxylate provided for low exotherm of 150° F. or less and provides for the preparation of catalyzed, cured, cast products without scorching or cracking due to high exotherm.

What is claimed is:

1. A peroxide-generating composition adapted for use with an unsaturated polyester resin composition to provide a low exotherm, peroxide-cured polyester resin composition, which peroxide-generating composition comprises:
   a) an allyl alcohol alkanoate; and
   b) a metal salt promoter in sufficient concentration to generate from the allyl alcohol alkanoate a peroxide to effect a cure of the unsaturated polyester resin composition.

2. The composition of claim 1 wherein the metal salt comprises a metal carboxylate.

3. The composition of claim 1 wherein the metal salt comprises a cobalt fatty acid.

4. The composition of claim 1 wherein the metal salt comprises a metal fatty acid or a napthalate metal salt.

5. The composition of claim 1 wherein the allyl alcohol alkanoate comprises an allyl alcohol propoxylate.

6. A cured unsaturated polyester resin composition which includes the composition of claim 1 as a catalyst promoter for the curing of the unsaturated polyester resin composition.

7. The cured composition of claim 6 which includes an inert filler material therein.

8. The cured composition of claim 7 which includes a particulate inert filler in the amount of from about 50 parts to 350 parts by weight to 100 parts by weight of the polyester resin, and in which the cured resin composition has a thickness of greater than about 0.125 inches.

9. The cured composition of claim 6 wherein the unsaturated polyester resin comprises a di-alcohol selected from a group consisting of propylene glycol and neo pentyl glycol, and a dicarboxylic acid selected from a group consisting of fumaric and maleic acid, with saturated acids, orthophthalic and isophthalic acid.

10. A cured unsaturated polyester resin, which resin composition comprises:
   a) an unsaturated polyester resin having up to about 50% by weight of a styrene monomer;
   b) a metal salt promoter to promote the reaction of a peroxide;
   c) an inert filler material; and
   d) from about 1 to 20 parts to 100 parts by weight based on the unsaturated polyester resin of an allyl alcohol alkanoate, which in the presence of the metal salt promoter provides in situ generation of a peroxide for the cure of the unsaturated polyester resin.

11. The composition of claim 10 wherein the metal salt promoter is a cobalt carboxylate present in an amount from about 0.1 to 1.0 to one part per 100 parts of the polyester resin.

12. The composition of claim 10 wherein the inert filler material comprises from about 50 parts to 350 parts of an inert particulate filler material to provide a cured, cast polyester product.

13. The composition of claim 10 wherein the allyl alcohol alkanoate comprises allyl alcohol propoxylate.

14. The method for the low exothermic curing of an unsaturated polyester resin composition, which method comprises:
   adding to an unsaturated polyester resin composition subject to cure by the employment of a curing amount of a peroxide a sufficient amount of an allyl alcohol alkanoate in the presence of a metal salt promoter in an amount which generates from the allyl alcohol alkanoate a sufficient amount of peroxide formed in situ for the curing of the unsaturated polyester resin composition.

15. The method of claim 14 wherein the curing of the unsaturated polyester resin composition is carried out at an exotherm of less than about 200° F.

16. The method of claim 14 wherein the metal salt promoter is present in the unsaturated polyester resin composition prior to the addition of the allyl alcohol alkanoate.

17. The method of claim 16 wherein the metal salt promoter is added to the allyl alcohol alkanoate and added to the unsaturated polyester resin composition with the allyl alcohol alkanoate.

18. The method of claim 14 which includes incorporating into the unsaturated polyester resin composition an inert filler material to prepare a cured, cast polyester product.

19. The method of claim 14 wherein the metal salt promoter comprises a cobalt carboxylate.

20. The method of claim 14 wherein the allyl alcohol alkanoate is added in an amount of from about 1 to 20 parts to 100 parts by weight of the unsaturated polyester resin composition.

21. The method of claim 14 which includes adding the allyl alcohol alkanoate to a metal salt promoted unsaturated polyester resin composition containing up to about 50% by weight of a diluent monomer.

22. A cured unsaturated polyester resin composition prepared by the method of claim 14.

* * * * *